United States Patent
Collin

(10) Patent No.: US 7,150,181 B2
(45) Date of Patent: Dec. 19, 2006

(54) APPARATUS FOR TESTING THE PURITY OF PLASTIC MELTS

(75) Inventor: Heinrich Collin, Vaterstetten (DE)

(73) Assignee: Dr. Collin GmbH, Ebersberg (DE)

( * ) Notice: Subject to any disclaimer, the term of this patent is extended or adjusted under 35 U.S.C. 154(b) by 381 days.

(21) Appl. No.: 10/824,557

(22) Filed: Apr. 14, 2004

(65) Prior Publication Data

US 2004/0191123 A1 Sep. 30, 2004

Related U.S. Application Data

(63) Continuation-in-part of application No. PCT/EP02/11545, filed on Oct. 15, 2002.

(30) Foreign Application Priority Data

Oct. 15, 2001 (DE) ................. 101 50 796

(51) Int. Cl.
*G01N 11/00* (2006.01)

(52) U.S. Cl. ................................... 73/53.01

(58) Field of Classification Search ............... 73/53.01
See application file for complete search history.

(56) References Cited

U.S. PATENT DOCUMENTS

| 6,171,433 | B1 * | 1/2001 | Otaigbe et al. | .......... 156/272.2 |
| 6,533,563 | B1 * | 3/2003 | Otaigbe et al. | ................. 425/6 |

\* cited by examiner

*Primary Examiner*—Hezron Williams
*Assistant Examiner*—John Fitzgerald
(74) *Attorney, Agent, or Firm*—Klaus J. Bach

(57) ABSTRACT

In a device for testing the purity of a plastic melt by plasticizing a melt and pressing a defined quantity of the melt through a screen with a defined size and porosity while simultaneously measuring the melt pressure, a changeover valve with two positions is provided—namely a working position for the test operation and a cleaning position—and furthermore a screen changer is provided, which has at least two screen positions in the interior of the testing device which is heated, namely a pre-heating and a testing position, in addition to a respective insertion and removal positions.

9 Claims, 3 Drawing Sheets

APPARATUS FOR TESTING THE PURITY OF PLASTIC MELTS

This is a Continuation-In-Part Application of International application PCT/EP02/11545 filed Oct. 15, 2002 and claiming the priority of German application 101 50 796.8 filed Oct. 15, 2001.

BACKGROUND OF THE INVENTION

The invention resides in an apparatus for testing the purity of a plastic melt by plasticization of the melt for example in an extruder and pressing a predetermined amount of this melt through a sieve or screen of predetermined size and mesh width while, at the same time, the melt pressure is determined which is built up ahead of the screen. In the literature, the procedure is called pressure filter test.

Such an apparatus is known from DE-A 198 55 058. The pressure filter test is a standardized testing method for the quantification of the quality of thermoplastic raw materials, particularly of compounds. The content of agglomerates of particles which have not been melted and of filler materials which have not been sufficiently dispersed, such as pigments, are retained in a screen. A predetermined amount of a melt is extruded using a screen of a certain area and a certain mesh width.

With the progressing clogging of the screen by particles, the pressure in the material ahead of the screen increases. The pressure or the pressure increase ahead of the screen is a measure for the quality of the melt or, respectively, for the fineness of the filler materials, for example, pigments and, consequently the quality of the compounds or respectively the master batch.

The quality of the product is characterized by the pressure filter valve DF. This value is calculated today still in different ways, but it is formed essentially by the quotient of the pressure difference (end pressure minus starting pressure) divided by the weight of the melt extruded during the testing period.

$$DFT=(P_1-P_2)/W$$

Today in practice the plastic material granulate is heated in a single auger and is then supplied melted and under pressure to a screen which is arranged downstream.

To this end, there are two basically different methods of determining a certain amount of melt which is pressed through the screen:

a) In a simple version, a certain amount is either weighed and all is pumped through the extruder and the screen, or the material leaving the screen is collected on a scale and is weighed, b) In an often used version, the melt is supplied from the single screw extruder to a gear pump. The gear pump is operated at an exactly defined speed and moves a defined amount of melt through the screen independent of the pressure, since there is almost no slip.

The component of such a testing apparatus which will be called below the screen consists of a solid perforated disc of steel which can accommodate the increasing pressure forces generated in the melt by the increasingly blocked screen with the screen discs disposed in the steel disc. The screen discs may be contained by an outer bent-over rim portion. The screen must be mounted in a pressure-tight manner so that the melt cannot escape at the sides past the discs. For each test, a new screen must be used.

However, for changing the screen:
the melt pressure must be lowered,
the extruder and, if applicable, the melt pump must be shut down,
the screen mounting clamps must be opened,
the used screen must be removed from the hot apparatus,
the support surface must be cleaned,
a new perforated plate with a new screen disc must be inserted,
the mounting clamp, for example a C-clamp, must be placed in position and closed,
one has to wait several minutes until the perforated plate and the screen are again heated to the temperature of the apparatus,
then the extruder and, if applicable, the pump can be switched on again to perform the next test.

This procedure which is generally practiced today is highly time consuming and also work intensive. In addition, it jeopardizes the safety of the operator since he constantly has to handle hot parts.

Additional delays are caused by the shut down of the apparatus and the later restart of the apparatus requiring waiting for stable test conditions.

Another difficulty is caused by the fact that the melt flow is generally horizontal so that the perforated plate with the screen has to be installed in a vertical position (the disc being upright). There is therefore always the chance that the screen disc and seal rings drop down when they are inserted into the apparatus.

In a particular embodiment, commercially available screen changers are employed. These are generally apparatus in which two screens are disposed in a pivot plate and are pivoted back and forth. One screen is in an operating position, while, in the open position, a second screen can be removed or placed in position. This system saves the opening of a flange and the normal removal of the screen. However, the problem that the screen can be replaced only with depressurization of the melt remains. It is therefore still necessary to shut down the drive, to wait for the pressure to drop and, after pivoting the screen changer, to wait for the perforated plate to reach operating temperature to start the extruder etc. In addition, there is the sealing problem. Sealing occurs with standard screen changers by a self-sealing element. However, such a seal is not tight in wide viscosity ranges as they are common in DFT tests.

There are also screen changers, which rotate quasi-continuously from one position to the next. These systems are used in manufacturing machinery and are so large and expensive that they cannot be used for testing purposes with which the present invention is concerned.

The apparatus according to the state of the art have therefore the following disadvantages:

The changing of the screen to permit a new test procedure is time-consuming.

It requires the shut-down of the extruder to reduce the pressure,

It requires the operator to be experienced and skillful for removing the clogged screen and installing a new screen wherein he is also in danger to suffer burns, It requires waiting time to bring the screen up to operating temperature, It endangers the operator since the screen has to be removed from the hot nozzle flange, the hot surface must be cleaned and a new screen must be installed, and The procedure is subject to errors as many steps have to be performed manually and such errors may falsify the test result.

It is the object of the present invention to overcome these disadvantages.

SUMMARY OF THE INVENTION

In a device for testing the purity of a plastic melt, by plasticizing a melt and pressing a defined quantity of said melt through a screen with a defined size and porosity, while simultaneously measuring the melt pressure, there is a combination of a changeover valve for two positions— namely a working position for the test operation and a cleaning position—and a screen changer is provided, which has at least two screen positions in the interior of the heated testing device, namely a pre-heating and a testing position, in addition to a respective insertion and removal positions.

In the screen changer system according to the invention, the individual screens are further arranged in rows one after the other and together form a slide carriage which, with the insertion of a new screen, displaces all 3 screens disposed in front of it. The advance movement can be provided for by a pivot lever arranged at one side of the guide structure acting by way of a pressure pin on the last screen. In the state of the art, the screens are always installed in a separate carriage or pivot plate or a capstan handle. Such a component is not needed in the present case.

In another advantageous embodiment of the invention, the screen can, in the test position, be moved additionally in a direction normal to the advance direction for pressing it into engagement with the area which includes the opening through which the melt is admitted, that is, for sealing the circumference of the screen with the housing in order to prevent the leakage of the melt.

In that case, the conical nozzle part disposed downstream in the flow direction of the melt is provided with an external thread and is so rotated by way of a pivot lever that the nozzle part lifts the screen and presses it against the housing disposed thereabove.

It is advantageous if the test apparatus is so arranged that the screen can be mounted in the apparatus in a horizontal position. This facilitates the installation because then the screen disc disposed on the perforated plate and a screen disc and a seal ring disposed on top remain in position whereas, with a vertical arrangement, those components may always fall out of the apparatus.

Furthermore, with the melt being discharged straight downwardly, the safety for the operator is increased since melt splashes caused by air inclusions are less dangerous. The apparatus according to the invention may be operated selectively simply by a single screw extruder or in combination with a gear melt pump which supplies a constant flow volume to the apparatus.

The apparatus according to the invention includes means for accurately controlling the temperature. Those may be heating elements or heating sleeves with temperature sensors and external control apparatus.

In a particular embodiment of the invention all three movements performed at the apparatus, that is:
  the pivoting of the melt valve,
  the pressing of the screen against the housing,
  the advancing of the screen not by normal actuation of the pivot lever, but selectively by pneumatic or hydraulic or electric motor-operated devices, may be automatically performed.

Such a testing apparatus including all the measures according to the invention has the following advantages:
  the time required for changing the screen is dramatically shortened,
  no enclosure for the extruder and melt pump is necessary,
  the preheating of the new screen is an integral part,
  sealing occurs safely,
  the removal of the old screen and the insertion of a new screen is very simple,
  the operational safety is increased.

The advantages and features of the invention will become more readily apparent from the following description of an embodiment thereof on the basis of the accompanying drawings.

DESCRIPTION OF A PARTICULAR EMBODIMENT

Figure 1:
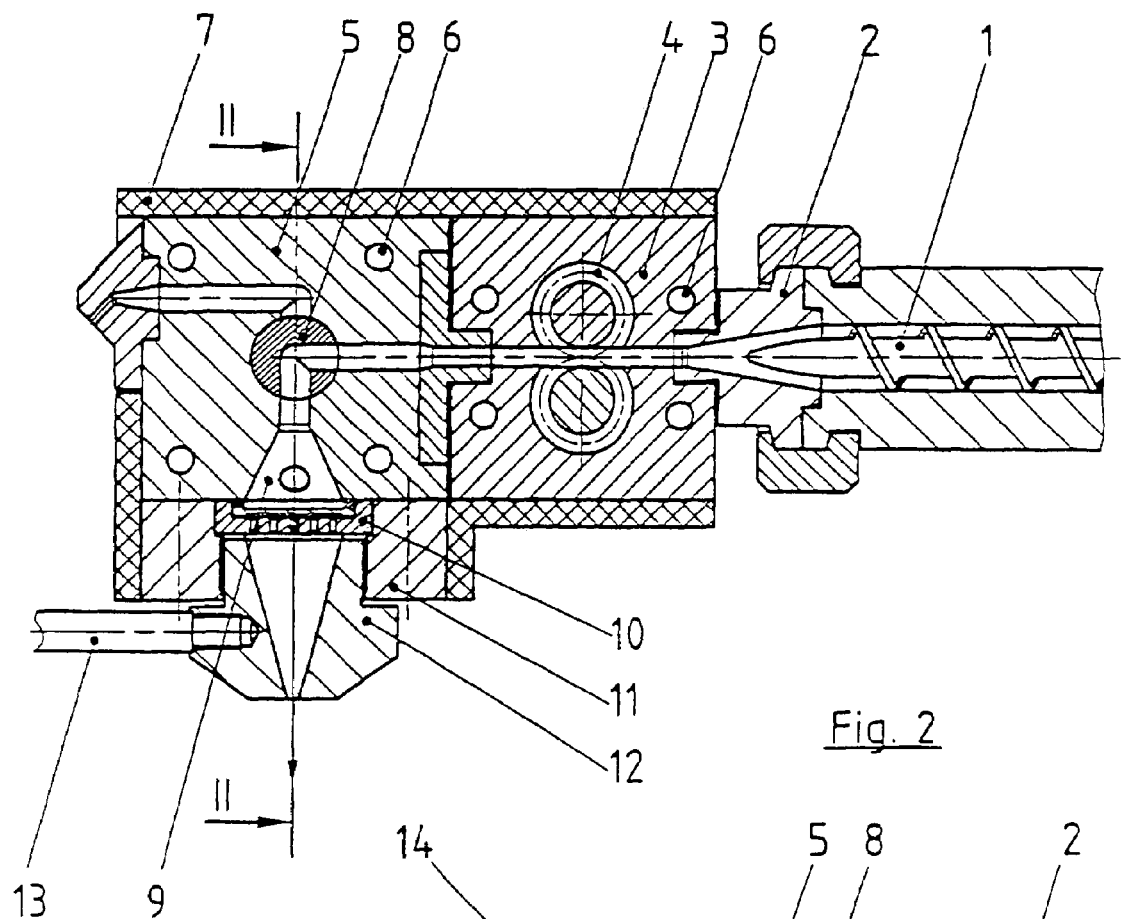
FIG. 1 is a longitudinal cross-sectional view of an extruder, a melt pump and arrangement for the pressure filter testing.

FIG. 1 shows the apparatus according to the invention which includes a single screw extruder 1, which plasticizes plastic material and transports it to a melt pump 3. The melt pump 3 is a gear pump including a pair of gears 4, which pump the melt with constant speed that is with a constant flow volume into the testing arrangement 5. Heating elements 6 heat the melt pump 3 as well as the testing arrangement 5. The arrangement is provided with insulating plates 7 to limit heat losses. The testing arrangement 5 includes a melt valve 8, which is pivotable about its center axis. As shown in FIG. 1, the melt channel is diverted downwardly by the melt valve 8 so that the melt flows into the conically opening pressure space 9. In the lower part 11 of the testing arrangement 5, a screen 10 is installed. It is pressed by the nozzle housing 12, which is treaded, against the upper part of the testing arrangement 5. The nozzle housing 12 is provided with a handle 13 to facilitate rotating the nozzle housing 12 and pressing it upwardly so that the screen 10 is sealed against the top part of the testing arrangement 5 and even with the occurrence of high pressures when the screen is largely clogged no melt will leak out and falsify the measuring results.

Figure 2:
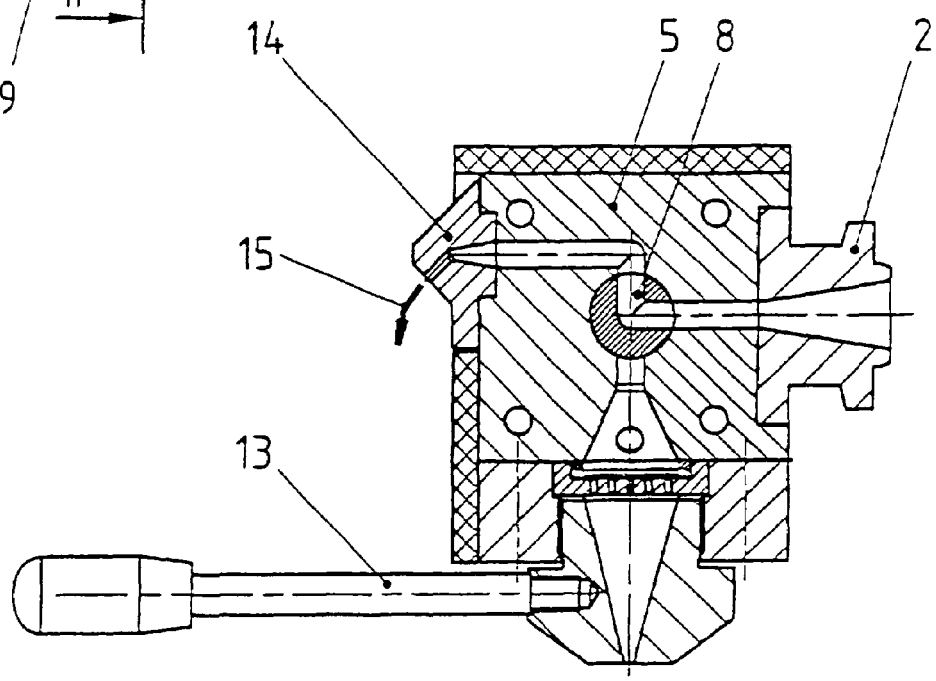
FIG. 2 is a cross-sectional view showing the apparatus with the melt valve rotated into a screen change position

FIG. 2 shows part of the arrangement shown in FIG. 1, wherein however the testing arrangement 5 is directly provided with a flange 2 so that the extruder can be coupled directly to the testing arrangement 5. In this case, no melt pump is provided.

Also, the melt valve 8 is shown rotated counter clockwise by 90°. The melt channel then extends upwardly from the valve and leads to the discharge nozzle 14 through which the material 15 is discharged to the ambient. This position of the melt valve 8 is selected for a change of a screen in order to release the melt pressure.

Figure 3:
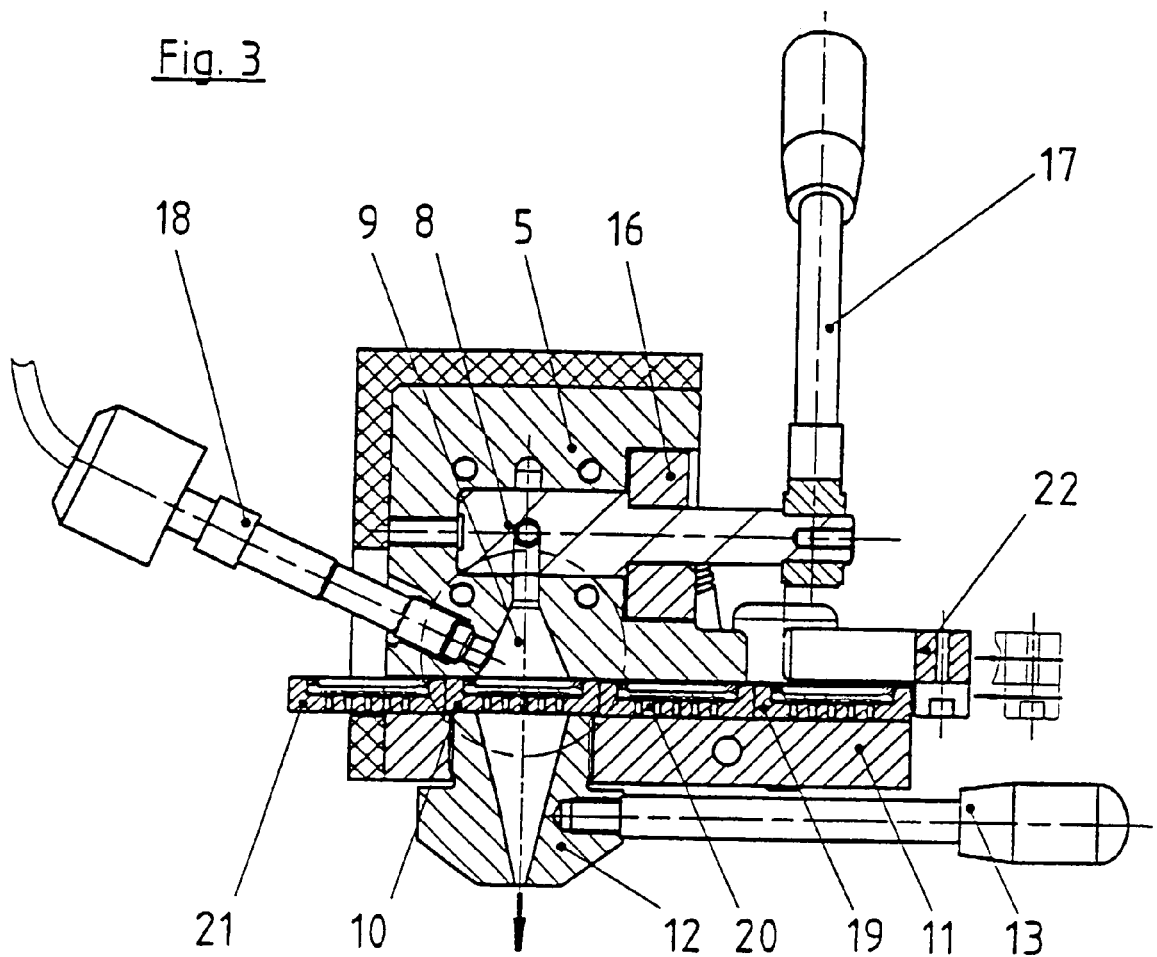
FIG. 3 is a cross-sectional view oriented normal to that of FIG. 1.

FIG. 3 is a cross-sectional view of the testing apparatus in the plane II—II of FIG. 1. The melt valve 8 is axially supported by a front support block 16 and is pivoted by the lever 17 from the tester position as shown in FIG. 2. The pressure of the melt in the pressure space 9 in front of the screen 10 is measured by the pressure sensor 18, is amplified and is indicated by a display unit and recorded. The testing ratio includes a lower part 11 provided with a groove-like recess into which up to four screens 10 may be inserted so that they are slidably supported therein. Screen 19 is in the insert position, screen 20 is in the pre-heat position and screen 10 is in the operating position pressed by the conical nozzle 12 against the testing arrangement part 5, and screen 21 is in the removal position. The screens are moved altogether by the pressure pin 22, which may be connected to a slide member or a pivot arm.

Figure 4:
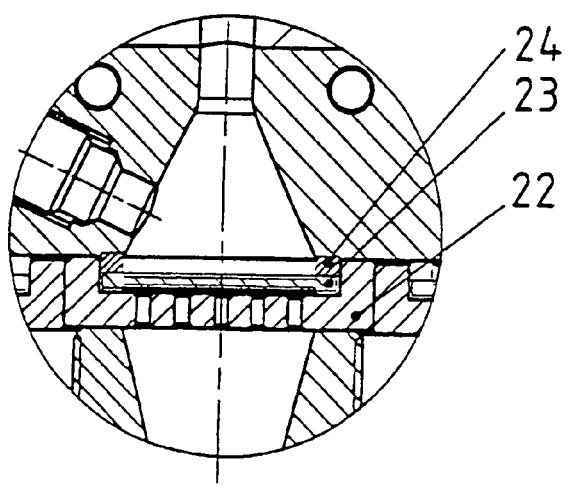
FIG. 4 shows a part as circled in FIG. 3 in an enlarged view.

FIG. 4 shows an enlarged section of FIG. 3 showing the design of the screen 10. The screen 10 comprises a perforated steel plate 22 provided with a recess in which a screen disc 23 or several screens with different mesh sizes are received. Often, they are provided with a metal frame and a small seal ring 24.

Figure 5:
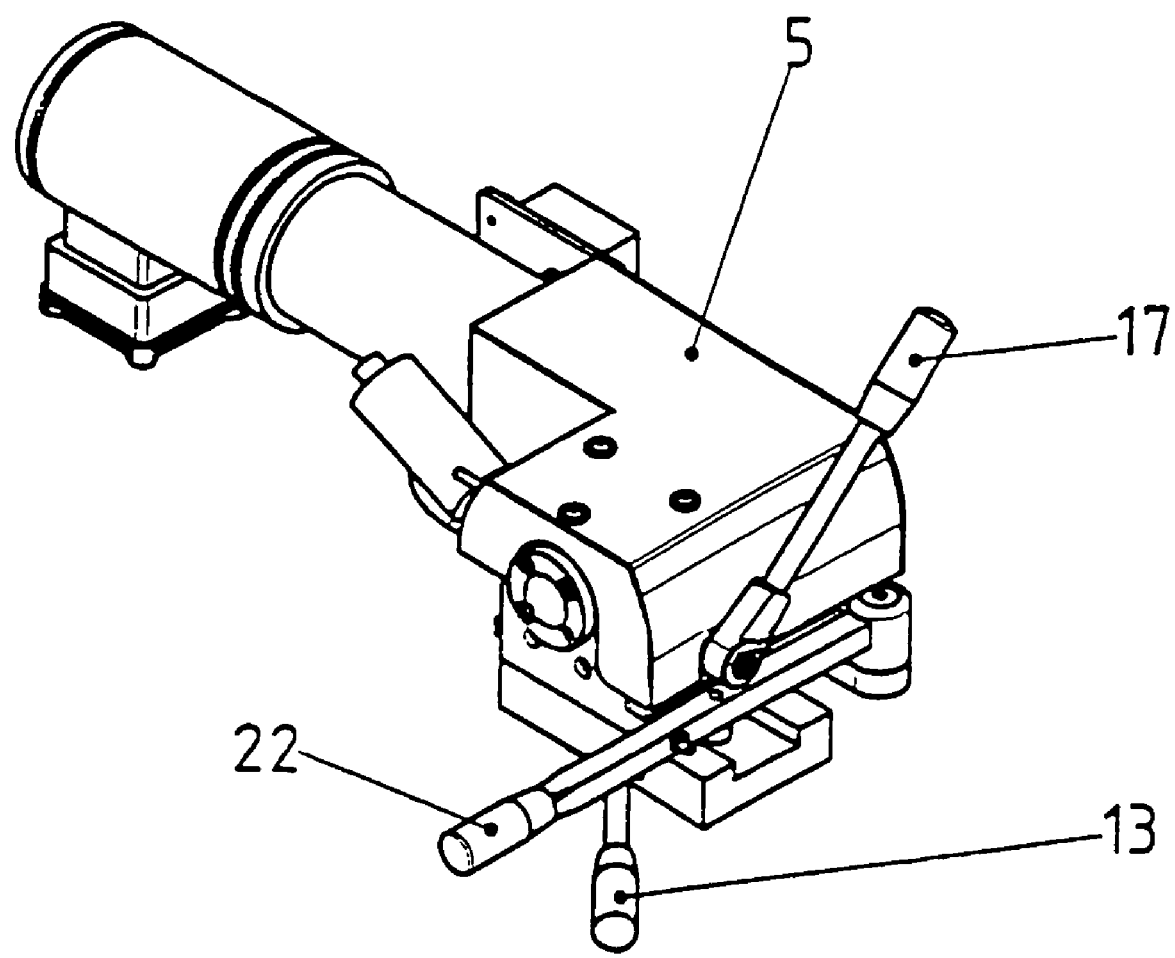
FIG. 5 is a perspective view of the apparatus according to the invention.

FIG. 5 shows the apparatus in a perspective view wherein the positions of the three levers actuated during a screen change are shown. The apparatus is shown in the operating position wherein the lever 17 for operating the melt valve 8 is pivoted to the right, the lever 13 for tightening the conical nozzle housing 10 is pivoted toward the right and the lever 22 is in a position in which the screens in the recess in the lower part 11 are moved to the left.

For changing the screen, the following procedure is followed:

The melt valve 8 is first pivoted from the testing position to the cleaning position as shown in FIG. 2. Since this is done rapidly, the extruder and the melt pump may remain active. Then the conical nozzle housing 12 is lowered by rotating the handle 13. The pressure in the pressure chamber 9 drops and the screen 10 is now free to be moved. Then, with only a relatively small force, the group of four screens can be moved to the next position by pushing the lever 22 toward the left. The preheated screen 20 is moved thereby into the test position. Upon closing the conical nozzle housing 12 by moving the handle 13 to the right, the screen 20 is firmly installed.

Then the melt valve 8 can be moved again from the screen-change position to the operating position so that the melt is again directed into the pressure space and a new test can be performed. The used screen can be removed at the left (FIG. 3) and can then be cleaned. At the opposite end, a new screen is placed into the recess in the lower part 11.

The whole procedure takes about 10 seconds and can be performed by any person. No particular skills are required. As a result, a substantial improvement over the state of the art is achieved.

What is claimed is:

1. An apparatus for testing the purity of plastic melts by plastification of the melt and pressing a defined amount of the melt through a screen of predetermined size and mesh width and measuring the pressure of the melt which is built up in front of the screen, said apparatus including a testing arrangement with a flow control valve to which the plastic melt is supplied, said flow control valve having an operating position in which the melt is directed toward the screen through which the melt is passed under pressure and a release position in which the melt is discharged, said screen being supported in a screen change system having at least two screen positions in the interior of the apparatus, a preheat position and a test position, and means for moving the screen from said preheat position to said test position while moving concurrently a used screen from the test position out of the apparatus.

2. An apparatus according to claim 1, wherein said apparatus includes a melt-pump for supplying a constant melt volume flow to said screen.

3. An apparatus according to claim 1, wherein said apparatus includes heating means and heat sensors for controlling the apparatus temperature.

4. An apparatus according to claim 1, wherein four screens are arranged in a row adjacent one another so as to form a slide arrangement in a recess formed in a lower part of said arrangement, said screen being movable concurrently by moving the last inserted screen.

5. An apparatus according to claim 4, wherein mechanical means are provided for moving said screens through said apparatus.

6. An apparatus according to claim 5, wherein means are provided for pressing a screen disposed in the test position into firm sealing engagement with the upper arrangement part.

7. An apparatus according to claim 6, wherein said means for pressing a screen into engagement with the arrangement part comprises a threaded nozzle housing which is provided with a lever for tightening the nozzle housing against the screen.

8. An apparatus according to claim 7, wherein the testing apparatus is so arranged that the screens are disposed in said recess in the lower arrangement part in a horizontal position.

9. An apparatus according to claim 8, wherein said mechanical means include means for actuating said melt valve and for moving the nozzle housing.

* * * * *